April 18, 1961   R. S. WILLIAMS   2,980,835
MECHANICALLY REBALANCED LINEAR MOTOR SERVOSYSTEM
Filed July 3, 1959
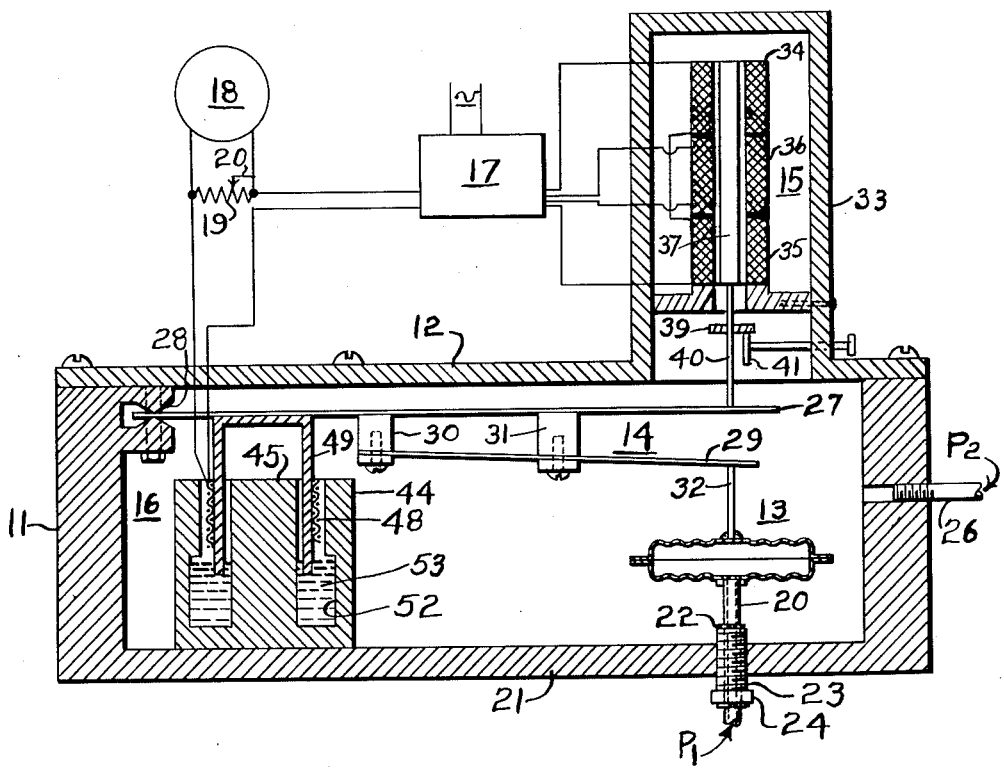
Ray S. Williams
INVENTOR.
BY Gerald B. Tjoflat

United States Patent Office 2,980,835
Patented Apr. 18, 1961

2,980,835

MECHANICALLY REBALANCED LINEAR MOTOR SERVOSYSTEM

Ray S. Williams, Orrville, Ohio, assignor to Hagan Chemicals & Controls, Inc., Pittsburgh, Pa., a corporation of Pennsylvania Filed July 3, 1959, Ser. No. 824,900

2 Claims. (Cl. 318—22)

This invention relates to condition responsive signal generating devices and more particularly to devices that respond to changes in input pressures and generate or convert the pressures into electric output signals that are proportional to the input pressures.

An object of this invention is to provide a device that is sensitive to a variable pressure input and provided with means for generating an electric output that is proportional to the input.

Another object is to provide a device as above set forth that is so designed that it may be constructed as a small, compact unit and yet be sensitive to small input changes and produce accurate outputs.

A further object is to provide a device as above set forth that is provided with feed-back means for balancing the output against the input.

A still further object is to provide a device in which the feed-back means is provided with a built-in damping means.

And a still further object is to provide a device which is responsive to either single or differential input pressures.

The foregoing and other objects of the invention will be apparent to those of ordinary skill in the art to which the invention pertains from the following description and the accompanying drawing in which the single illustration is a view in longitudinal, vertical section of a device arranged and constructed in accordance with an embodiment of the invention.

The pneumatic signal responsive transmitter shown in the drawing as illustrating what now appears to be a preferred form of the invention, comprises a housing 11 which is closed by a cover 12 and within which is contained a pressure-sensitive input means 13, a lever system 14, an electromagnetic output means 15, and a feed-back means 16. The feed-back means 16 operates on the lever system 14 so as to oppose and balance the actuating forces applied thereto by the input means 13.

Motion of the input means 13 in response to pressure changes is transmitted through the lever system 14 to the electromagnetic output means 15, which, as shown, comprises a differential transformer. The output voltage of the differential transformer is delivered to an amplifier 17. The amplifier 17 may be of the transistor type in as much as the output voltages are relatively low and it may be provided with means for rectifying the amplified output thereof. The output of the amplifier is fed back to the feed-back means 16 and to a receiving means 18. The receiving means 18 may comprise a recorder, an indicator, a control device arranged to regulate a condition having to do with changes in the magnitude of the input pressure to the signal responsive means 13.

The output of the amplifier-rectifier 17, as shown, passes through a potentiometer 19 across which the means 18 is connected. That potentiometer may be provided with a slide contact 20 whereby the output to the means 18 and to the feed-back means 16 may be properly proportioned and adjusted.

The signal input means 13, as shown, comprises a capsule or bellows which is pressure-tight and which is connected by a tube 22 extending outwardly through a wall 23 of the housing 11. As shown, the tube 22 is received by a ferrule 23 extending through a threaded bushing 24 that has screw thread engagement with the wall of the housing. A nut 25 is provided for clamping the ferrule 23 in pressure-tight relationship with the bushing and the tube.

The tube 20 may convey to the interior of the capsule an input pressure, the magnitude of which varies in accordance with a condition to be measured, regulated or controlled.

The housing in which the capsule 13 is located is pressure-tight. Therefore, the capsule 13 may be made responsive to a pressure differential, that is, the difference between a pressure P1 supplied to the tube 20 and a pressure P2 supplied to the interior of the housing through a pipe 26. So long as pressure P1 is greater than pressure P2, the deflection of the capsule will be proportional to the difference between those pressures.

The lever system 14 comprises a cantilever 27 in the form of a relatively stiff spring that is anchored at one end in a fulcrum 28 supported by an end wall of the housing. The system also includes a lever 29 that is supported by a block 30 secured to one end of the lever 27. The angle between levers 27 and 29 may be adjusted by means of a spreader block 31 secured to the lever 29 but which is slidable along the same so that the lever 29 may be adjusted clockwise or counterclockwise about its supporting block 30, depending upon the position of the block 31.

The capsule 13 is provided with a pin 32 disposed to engage the free end portion of the lever 29 so as to actuate the lever system counterclockwise with increasing pressures on the capsule or increasing differentials and in a clockwise direction as these pressures or differentials decrease.

The motion of lever 27 is utilized to actuate a core in the differential transformer 15 housed in a tubular portion 33 of the cover 12. The transformer 15 comprises coaxially spaced coil windings 34, 35, and 36, and a core 37 movable coaxially of the coil windings.

Windings 34, and 35 may, as shown, be connected in series and constitute the primary or input windings. Winding 36, being disposed between windings 34 and 35, constitutes the output winding.

When the core 37 is in neutral position, that is, in a position where it has the same magnetic linkage with all of the windings, the output of the winding 36 is zero. If the core is moved downwardly so that there is more induction in coil 36 from coil 35 than from coil 34, the output voltage of coil winding 36 will have a certain phase relationship and value or magnitude, depending upon the position of the core. If the core is moved upwardly from the mid or neutral position, the output voltage in the winding 36 reverses in phase and the magnitude is proportional to the position of the core from mid or neutral position.

Since the amplifier 17 is of the non-discriminating type and since devices of the type disclosed, must operate from a zero to a maximum and back to zero always on the same side of zero, means are provided for ensuring that the core 37 will have a definite mid or neutral position, so that it can only be moved in one direction from that position. Therefore, means are provided for arresting and positively stopping motion of the core in one direction. As shown, that motion is arrested in the downward direction. The means illustrated comprises a collar 39 carried by a stem 40 connected to the core and disposed to be engaged by the free end of lever 27. The collar rests in its zero position on a cam 41 carried by a spindle extending through and adjustable from the exterior of the tubular portion 33.

The output of the amplifier-rectifier 17 energizes the feed-back responsive means 16. That means comprises a magnetic cup-like shell 44 having a closed bottom of magnetic material and a central core 45 of permanent magnetic material. The annular space between the core 45 and the inner wall of the shell 44 accommodates a feed-back coil winding 48. That coil winding, as shown, is carried by a tubular member 49 secured at its upper end to the beam 27.

The fed-back means 16, as shown, may be provided with a built-in damping means that comprises a well 52 in the lower portion of the shell 44 that contains a viscous damping fluid 53. The lower end of the coil support member 49 extends into the viscous fluid. Thus, as the beam 27 rocks or tilts about its fulcrum 28, the lower end of the coil support member 49 is forced into the liquid to a greater or lesser degree, thereby damping the motion of the lever system and the feed-back means. This damping also stabilizes the position of the core 37 and in turn stabilizes the output of the amplifier-rectifier 17.

The pressure input responsive means 13, being mounted as shown, provides an effective and simple means for adjusting the zero position of the lever system because the stem 32 may be so conveniently raised or lowered within the housing by merely adjusting the tube 20 in its ferrule 22.

The adjustment of the angle between members 27 and 29 may be made by merely sliding the block 31 to the right or to the left. This also makes it possible to conveniently adjust the output range of the device.

Having thus described the invention, it will be apparent to those of ordinary skill in the art to which the invention pertains that various modifications and changes may be made in the illustrated embodiment without departing from either the spirit or the scope of the invention.

Therefore, what is claimed as new and desired to be secured by Letters Patent is:

1. A pneumatic electric converter comprising a pressure-tight housing having therein a differential transformer comprising axially spaced input and output windings and a magnetic core disposed axially of the windings and movable relative thereto, means for supporting said core at mid position so that it is movable in one direction only from said position, a bellows having means for supplying input pressure to the interior of the same in said housing, a lever system disposed for actuation by said deflectable means and arranged to actuate said core from said mid position as the input pressure to said deflectable means increases, means for amplifying and rectifying the output voltage of said transformer and feed-back means responsive to said output voltage and connected to said lever system in such a way as to oppose and balance the force exerted by said pressure deflectable means on said lever system, said feed-back means comprising a magnetic shell having therein a centrally disposed core of permanent magnetic material, a coil winding embracing said core and connected to said lever system whereby the current in the coil develops a force that opposes and balances the force of the bellows on said lever system, a well formed in the space between the core and the shell and in which a quantity of damping liquid is contained, and a tubular member embracing said core and extending into said liquid and carrying the coil winding.

2. A pneumatic electric converter comprising a pressure-tight housing having therein a differential transformer comprising axially spaced input and output windings and a magnetic core disposed axially of the windings and movable relative thereto, means for supporting said core at mid position so that it is movable in one direction only from said position, a pressure sensitive deflectable means in said housing, a lever system disposed for actuation by said deflectable means and arranged to actuate said core from said mid position as the input pressure to said deflectable means increases, said lever system comprising a first cantilever having a fulcrum at one end portion and having its free end disposed to actuate said core, and a second cantilever secured at one end to the fulcrumed end portion of the first cantilever and a block slidably disposed between said cantilever members for adjusting the angle therebetween, the pressure input means operatively engaging the free end portion of said second cantilever member, means for amplifying and rectifying the output voltage of said transformer and feed-back means responsive to said output voltage and connected to said lever system in such a way as to oppose and balance the force exerted by said pressure deflectable means on said lever system.

References Cited in the file of this patent

UNITED STATES PATENTS

| | | |
|---|---|---|
| 2,593,339 | Ostermann et al. | Apr. 15, 1952 |
| 2,602,660 | Shannon | July 8, 1952 |
| 2,686,893 | Markson | Aug. 17, 1954 |